P. W. HODGKINSON.
CAM MECHANISM.
APPLICATION FILED APR. 20, 1910.

1,012,851.

Patented Dec. 26, 1911.

Witnesses:
Clarence W. Carroll
L. Thon

Inventor:
Percy W. Hodgkinson
by his attorneys
Osgood, Davis & Dorsey

UNITED STATES PATENT OFFICE.

PERCY W. HODGKINSON, OF ROCHESTER, NEW YORK, ASSIGNOR OF ONE-FOURTH TO JACOB C. LOMBARD, OF ROCHESTER, NEW YORK.

CAM MECHANISM.

1,012,851. Specification of Letters Patent. Patented Dec. 26, 1911.

Application filed April 20, 1910. Serial No. 556,632.

*To all whom it may concern:*

Be it known that I, PERCY W. HODGKINSON, a citizen of the United States, and resident of Rochester, in the county of Monroe and State of New York, have invented certain new and useful Improvements in Cam Mechanism, of which the following is a specification.

This invention relates particularly to cam mechanism of the type employing a cam commonly designated as a "swash-plate," that is to say, a cam having the general characteristics of a rotary disk of which the surface is inclined to its axis of rotation, such a cam being employed to impart reciprocating movements to a cam follower having movement in a general direction parallel to the axis of rotation of the swash-plate.

The object of the invention is to provide a mechanism of the kind above referred to with improved means for varying the inclination of the cam with respect to its axis of rotation. To this end I employ an irreversible mechanism, this mechanism being directly connected with the cam and arranged to rotate therewith, so that it acts to hold the cam in adjusted position without the transmission of force and the production of friction between the relatively rotating parts of the mechanism.

Figure 1:
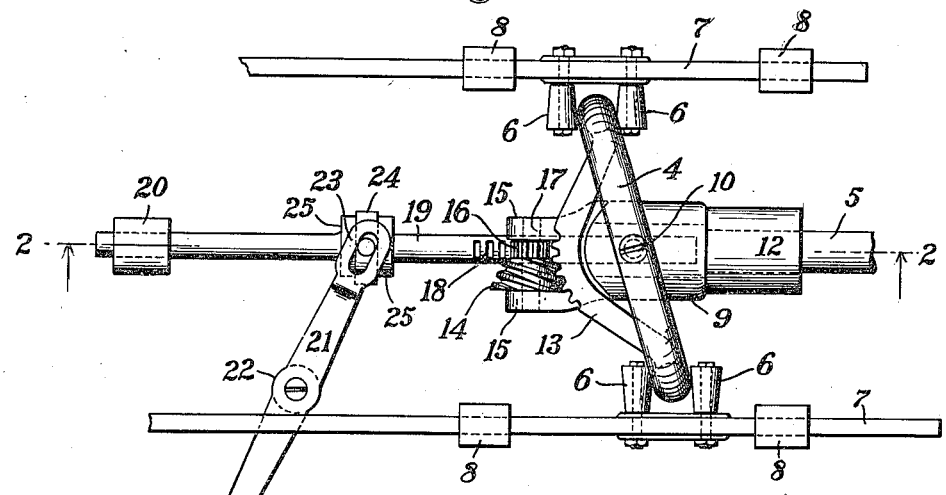
Figure 2:
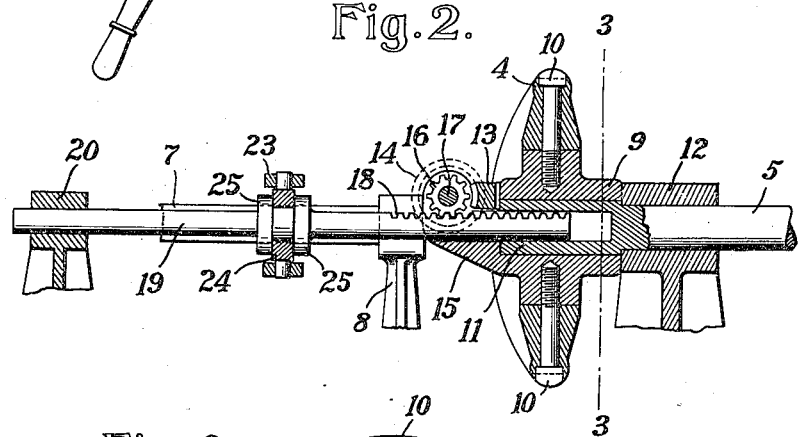
Figure 3:
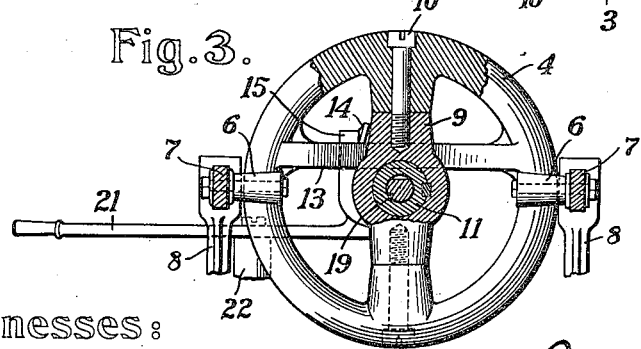

In the accompanying drawings:—Figure 1 is a plan view of a cam mechanism embodying the present invention; Fig. 2 is a section on the line 2—2 in Fig. 1, looking in the direction of the arrows applied to said line; and Fig. 3 is a section on the line 3—3 in Fig. 2, looking from right to left.

In the illustrated embodiment of the invention the cam comprises a ring 4 of toric form mounted to rotate about the axis of a power shaft 5 which may be connected with any suitable source of power. Two cam followers are shown on opposite sides of the axis of rotation, and each cam follower comprises two cam rolls 6 which engage opposite sides of the cam and are journaled upon a slide 7. The slides move in bearings 8 in a direction parallel with the axis of rotation of the cam.

In order that the inclination of the cam may be varied it is pivotally mounted upon a hub 9 by means of pivot screws 10 passing through the cam ring and into the hub. The hub 9 is keyed to an enlarged end 11 on the power shaft 5, and the shaft is journaled in a bearing 12 which may be supported in any suitable manner.

The mechanism for controlling and varying the inclination of the cam comprises a segmental worm-gear 13 fixed to the cam ring and engaged by a worm 14. The worm is fixed to a short shaft 17 which is journaled in lugs 15 projecting from the cam hub 9. A pinion 16 is also fixed to the shaft 17, and this pinion meshes with a rack 18 formed upon one side of a rod 19. One end of the rod slides in a recess in the enlarged end 11 of the power shaft and is concentric with the axis of the shaft. The other end of the rod 19 slides and rotates in a bearing 20 which is supported in any suitable manner.

The cam-adjusting mechanism is actuated by means of a lever 21 which may be operated by hand or in any other suitable manner. The lever 21 is pivoted upon a post 22 and has a forked end 23 provided with slots which engage gudgeon-pins projecting from a ring 24. The ring 24 surrounds the rod 19 and is confined between two flanges 25 extending from the rod. The construction just described is such that by swinging the adjusting lever 21 about its pivotal support the rod 19 is moved longitudinally, while at the same time the rod is free to rotate within the ring 24 as the cam rotates. Whenever it is desired to change the inclination of the cam and the amplitude of the movements imparted to the cam followers, this may be done during the rotation of the cam by operating the adjusting lever, and as a consequence of the movement of the lever the worm 14 is rotated and operates, through the segmental worm gear, to swing the cam about the pivot-screws 10, and in this manner the amplitude of movement of the cam followers may be varied from nothing to a maximum, according as the cam is moved to a position in which it is normal to the axis of rotation or to a position in which it has its maximum inclination to the axis.

The worm-and-gear mechanism above described constitutes, as is well known, an irreversible mechanism, that is to say, a mechanism through which power may be transmitted in one direction only, and it acts, therefore, to lock the cam in any inclined position to which it may be adjusted by the adjusting lever, so that the forces arising in the cam from the reaction of the cam followers and tending to move the cam back to the position normal to the axis of rotation cannot have this result, and the cam is thus constrained to remain in any position to which it is adjusted.

I am aware that cam-mechanism comprising swash-plates with means for varying their inclination have been proposed heretofore, and that the means for so adjusting or varying the inclination have comprised irreversible mechanism, but in all such previous devices the irreversible mechanism has been located in stationary position on the machine and connected with the swash-plate by sliding connections to permit the relative rotation of the swash-plate and the irreversible mechanism. For this reason, in all such previous devices there is a constant and considerable friction in such sliding connections, due to the reaction of the cam, which is resisted by the stationary irreversible mechanism. In my novel construction, on the other hand, by connecting the irreversible mechanism directly with the swash-plate and arranging it to rotate therewith, I entirely eliminate the friction just referred to, since the sliding parts by which the hand-lever or other controlling device is connected with the irreversible mechanism are not operative to transmit any force except at the moment of varying the inclination of the swash-plate. By this rearrangement of the parts I save wear on the mechanism and loss of power through friction.

To minimize lost motion between the cam and the cam rolls, the rolls are made conical in form, their greatest diameters being at the ends nearest to the axis of rotation of the cam. It will be noted that the points of greatest inclination of the cam, namely, the points at which the cam is pivotally supported, are also the points of greatest radius, that is, the points most distant from the axis of rotation. These parts of the cam, therefore, engage the cam rolls at the greatest distance from the axis of rotation and at points where the distance between the operative surfaces of the cam rolls is greatest, and the conical form of the rolls, therefore, results in an approximation to the necessary compensation for variations in inclination of the different parts of the periphery of the cam.

My invention is not limited to the details of construction of the illustrated embodiment thereof, but may be embodied in various forms within the nature of the invention as it is defined in the following claims.

I claim:—

1. Cam mechanism having, in combination, a rotary cam provided with a cam surface inclined to the axis of rotation of the cam, a cam follower engaging the cam surface and actuated thereby, and means operable during rotation of the cam to change the inclination of the cam to its axis of rotation, said means comprising an irreversible mechanism rotative with the cam.

2. Cam-mechanism having, in combination, a rotary cam provided with a cam-surface inclined to the axis of rotation of the cam, a cam-follower engaging the cam-surface and actuated thereby, a worm-and-gear mechanism for varying the inclination of the cam to its axis of rotation, said mechanism being mounted to rotate with the cam, and nonrotating means for actuating the worm-and-gear mechanism.

3. Cam-mechanism having, in combination, a rotary cam provided with a cam-surface inclined to the axis of rotation of the cam, a cam-follower engaging the cam-surface and actuated thereby, a member movable axially with respect to the cam, and connections between said member and the cam for moving the cam to change its inclination to the axis of rotation, said connection including two frictionally-engaging coöperating members constituting an irreversible mechanism and adapted to transmit motion to, but not from, the cam.

PERCY W. HODGKINSON.

Witnesses:
D. GURNEE,
L. THON.